US009925931B2

United States Patent
Dublan et al.

(10) Patent No.: US 9,925,931 B2
(45) Date of Patent: Mar. 27, 2018

(54) REVERSIBLE BRACKET FOR VEHICLE B-PILLAR TRIM

(71) Applicant: FORD GLOBAL TECHNOLOGIES, LLC, Dearborn, MI (US)

(72) Inventors: Fabrizio Dublan, Cuautitlan Izcalli (MX); Maria Fernanda Villanueva Ochoa, Tlainepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 14/887,002

(22) Filed: Oct. 19, 2015

(65) Prior Publication Data

US 2017/0106811 A1    Apr. 20, 2017

(51) Int. Cl.
*B60R 13/02* (2006.01)
*B62D 25/04* (2006.01)

(52) U.S. Cl.
CPC ........ *B60R 13/0206* (2013.01); *B60R 13/025* (2013.01); *B62D 25/04* (2013.01)

(58) Field of Classification Search
CPC .... B60R 13/0206; B60R 13/025; B62D 25/04
USPC .................................................. 296/193.06
See application file for complete search history.

(56) References Cited

U.S. PATENT DOCUMENTS

| | | | |
|---|---|---|---|
| 5,791,716 A | 8/1998 | Takagi et al. | |
| 6,409,256 B1 | 6/2002 | Page | |
| 8,371,632 B2 | 2/2013 | Akaba | |
| 8,388,039 B2 * | 3/2013 | Gerndorf | B60R 13/04 296/1.08 |
| 2003/0019824 A1 * | 1/2003 | Gray | A47B 57/30 211/26 |
| 2007/0164585 A1 | 7/2007 | Hasegawa et al. | |
| 2010/0025559 A1 * | 2/2010 | Rathbone | H01Q 1/1228 248/534 |
| 2013/0187368 A1 | 7/2013 | Donais et al. | |

* cited by examiner

*Primary Examiner* — Joseph D. Pape
(74) *Attorney, Agent, or Firm* — Vichit Chea; King & Schickli PLLC

(57) ABSTRACT

A reversible trim piece bracket includes a body including a first attachment edge and a second attachment edge that is differently configured from the first attachment edge. The first attachment edge and second attachment edge are configured to engage a cooperating surface on a vehicle, which may be associated with a vehicle structure such as a B-pillar. The first attachment edge may include one or more catches defining a first length for engaging the cooperating surface. The second attachment edge may include one or more catches defining a second length that is different from the first length for engaging the cooperating surface. An orienting structure may be provided for properly orienting the bracket body, which may be one or more notches defined in the bracket body for engaging one or more cooperating tabs associated with the vehicle trim piece.

12 Claims, 5 Drawing Sheets

REVERSIBLE BRACKET FOR VEHICLE B-PILLAR TRIM

TECHNICAL FIELD

This disclosure relates generally to motor vehicle pillars and trim therefor. More particularly, the disclosure relates to a pillar bracket configured for attachment to different pillar trim surface styles, to allow securing different trim styles to a common base.

BACKGROUND

As part of final vehicle assembly, different styles and configurations of interior trim elements are attached to portions of a vehicle, for example to an inner surface of the passenger cabin doors, to a B-pillar passenger cabin-facing surface. Such trim elements hide unattractive interior workings of vehicle components, and present an attractive and finished appearance to the consumer. Different trim packages for different vehicles (or indeed different trim packages for a same vehicle make and model) are often provided as customer options. For example, for a particular vehicle different trim packages may be offered, including trim pieces including a cloth-wrapped class A surface, trim pieces including a colored molded plastic class A surface, and others.

While attractive from the consumer perspective, such differing trim packages often require different attachment or fastening means due to differences in configuration, thickness, etc. Thus, for a same vehicle it may be a requirement to provide multiple differently configured attachment means such as brackets to accommodate different trim package styles. This adds complexity and cost (in materials, tooling, and labor) to the process of final vehicle assembly.

Thus, a need is identified in the art for structures to accommodate different vehicle trim packages.

SUMMARY

In accordance with the purposes and benefits described herein and to solve the above-summarized and other problems, in one aspect a reversible bracket for a vehicle trim piece is described, including a body including a first attachment edge and a second attachment edge that is differently configured from the first attachment edge. The first attachment edge and second attachment edge are configured to engage a cooperating surface on a vehicle, which may be associated with a vehicle structure such as a B-pillar.

In embodiments, the first attachment edge includes one or more catches defining a first length for engaging the cooperating surface and the second attachment edge includes one or more catches defining a second length for engaging the cooperating surface. The respective first and second edge catches define a first and a second length, with the second length being different from the first length. An orienting structure may be provided for properly orienting the bracket body. In embodiments, the orienting structure is one or more notches defined in the bracket body for engaging one or more cooperating tabs associated with the vehicle trim piece.

In another aspect, a vehicle trim piece is described including a trim piece body defining a class A surface and a reversible bracket as described above. The trim piece class A surface may be one of a cloth-wrapped class A surface and a molded class A surface.

In yet another aspect, a vehicle B-pillar and trim assembly is described, including a B-pillar, a cooperating trim piece including a body defining a class A surface, and a reversible bracket as described above. The bracket first attachment edge and second attachment edge are configured to engage a slider associated with the B-pillar. The trim piece class A surface may be one of a cloth-wrapped class A surface and a molded class A surface.

In the following description, there are shown and described embodiments of the disclosed motor vehicle trim bracket. As it should be realized, the trim bracket is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed trim bracket, and together with the description serve to explain certain principles thereof. In the drawing.

Reference will now be made in detail to embodiments of the disclosed trim bracket, examples of which are illustrated in the accompanying drawing figures wherein like reference numerals indicate like features.

DETAILED DESCRIPTION

Preliminarily, as will be seen the present disclosure describes the inventive trim bracket with reference to a trim bracket for accommodating varying styles of trim associated with a vehicle B-pillar. However, as will be appreciated, the disclosed bracket can readily be adapted to other vehicle pillars, or indeed to other portions of vehicles requiring attachment of one or more trim surfaces. Accordingly, the disclosure should not be taken as limiting to a vehicle B-pillar.

As background, a motor vehicle includes one or more pillars (sometimes referred to as posts) which provide structural support to various portions of the passenger compartment. As is known, pillars are the vertical or quasi-vertical supports of a vehicle's window area or "greenhouse." These pillars are by convention identified according to their placement beginning at a juncture of the engine compartment and the passenger compartment, and are numbered or lettered sequentially proceeding towards a rear of the vehicle. Thus, the pillars disposed at either side of the vehicle front windscreen are the A pillars. The pillars extending between the passenger compartment roof to the floor are the B pillars. The pillars disposed at a rear of the vehicle rear door are the C pillars. In longer vehicles such as station wagons, SUVs, limousines, etc. D pillars may be provided. Still more, vehicles with additional doors may be provided with more than one pair of B pillars, designated B1, B2, etc.

As summarized above, often different trim styles/configurations must be attached to vehicle components such as the B-pillars, and require different configurations of bracket for that attachment. To solve this and other problems, the present disclosure is directed to a reversible bracket for attaching a trim piece to a vehicle component such as a B-pillar. Advantageously, the disclosed bracket allows attaching different trim styles having different thicknesses and/or configurations, for example a cloth-covered trim piece or a molded trim piece, to a same vehicle component such as the B-pillar simply by altering the orientation of the bracket.

Figure 1:
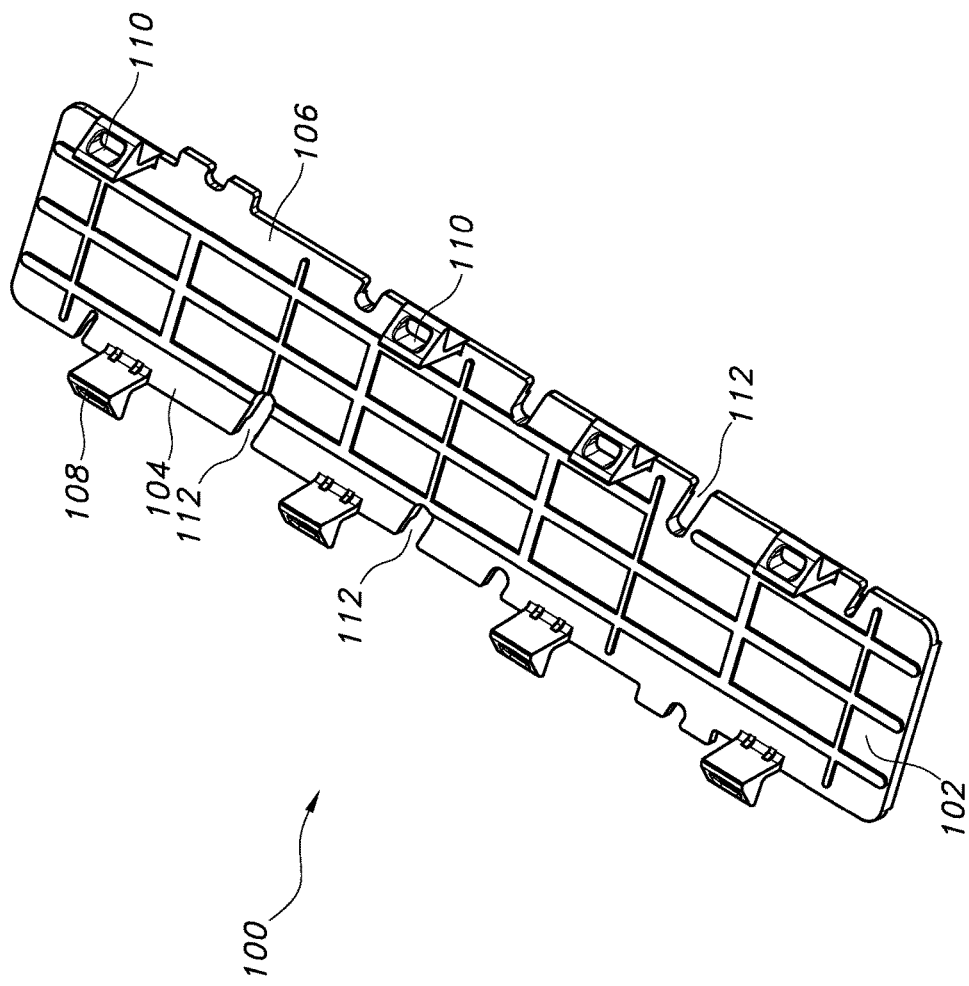
FIG. 1 depicts a front perspective view of a reversible trim piece bracket according to the present disclosure.
Figure 2:
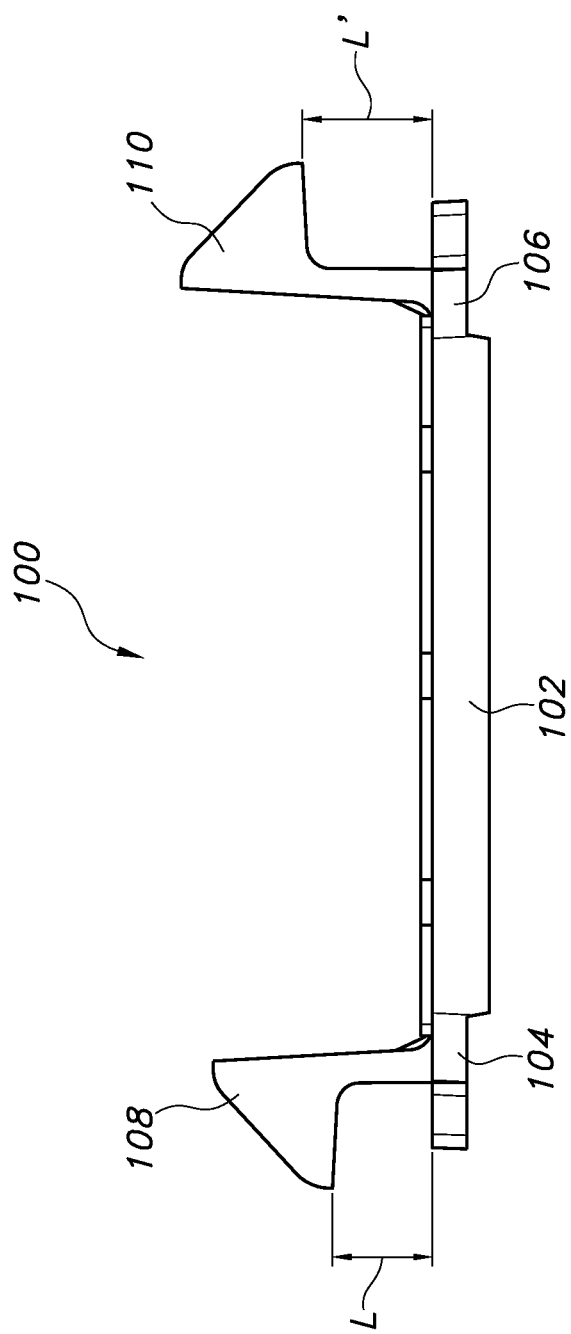
FIG. 2 depicts a side view of the bracket of FIG. 1.

With reference to FIG. 1, there is shown a reversible bracket 100 including a body 102, a first attachment edge 104, and a second attachment edge 106. Each attachment edge 104, 106 includes at least one catch for capturing a cooperating surface. Attachment edge 104 includes one or more first catches 108 each having a length dimension L, and attachment edge 106 includes one or more second catches 110 each having a length dimension L' that is different from length L. This is illustrated in FIG. 2.

In embodiments, bracket 100 further includes a "poka-yoke," i.e. a structure implemented to make improper orientation of the bracket impossible. In the depicted embodiment, the poka-yoke comprises a plurality of particularly placed notches 112 disposed along the first attachment edge 104 and the second attachment edge 106, for engaging cooperating tabs 304 associated with a vehicle B-pillar trim piece (see FIG. 3). Of course, alternative orienting structures are possible other than notches and cooperating tabs, and are contemplated for use herein.

Figure 3:
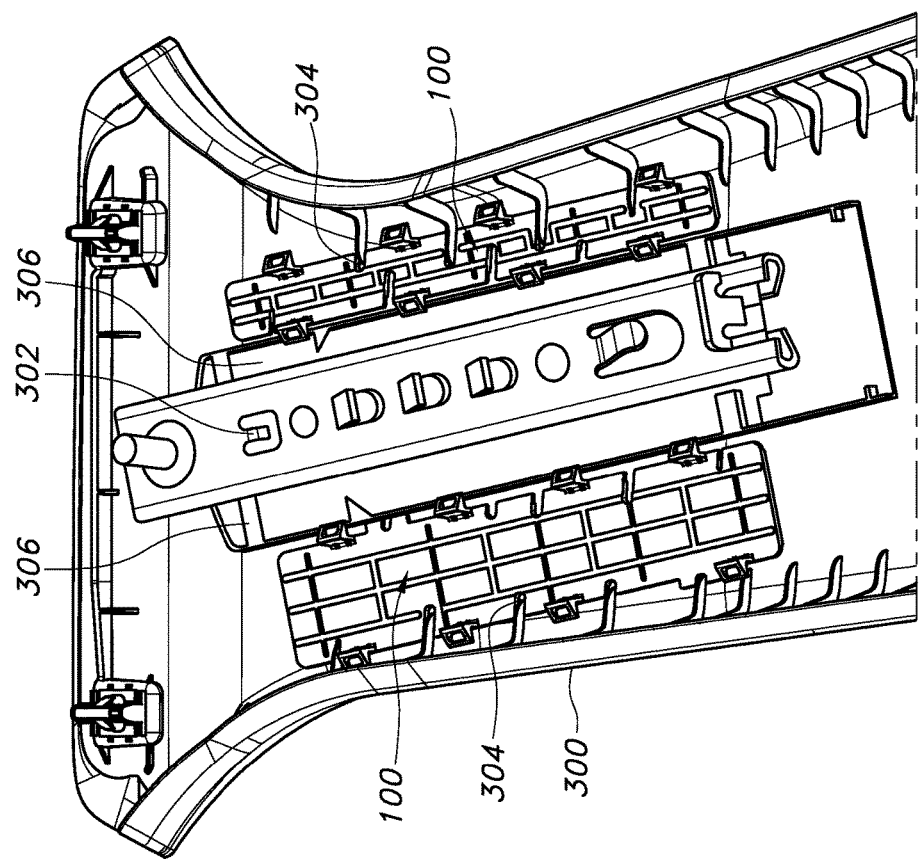
FIG. 3 depicts a B-pillar trim piece 300 according to the present disclosure.

FIG. 3 depicts a B-pillar trim piece 300 including a slider 302. As will be appreciated, slider 302 will be common to all trim pieces 300 regardless of configuration/thickness. As shown, trim piece 300 includes a pair of brackets 100 according to the present disclosure, with notches 112 engaged by tabs 304. Slider 302 includes an engaging surface 306 which, as will be described below, is configured for capturing by catches 108 or 110. As will be appreciated, tabs 304 are configured such that, for a particular trim piece 300 style, they will engage bracket notches 112 only if the bracket 100 is oriented properly for the particular trim piece 300. This is described in greater detail below.

Figure 4:
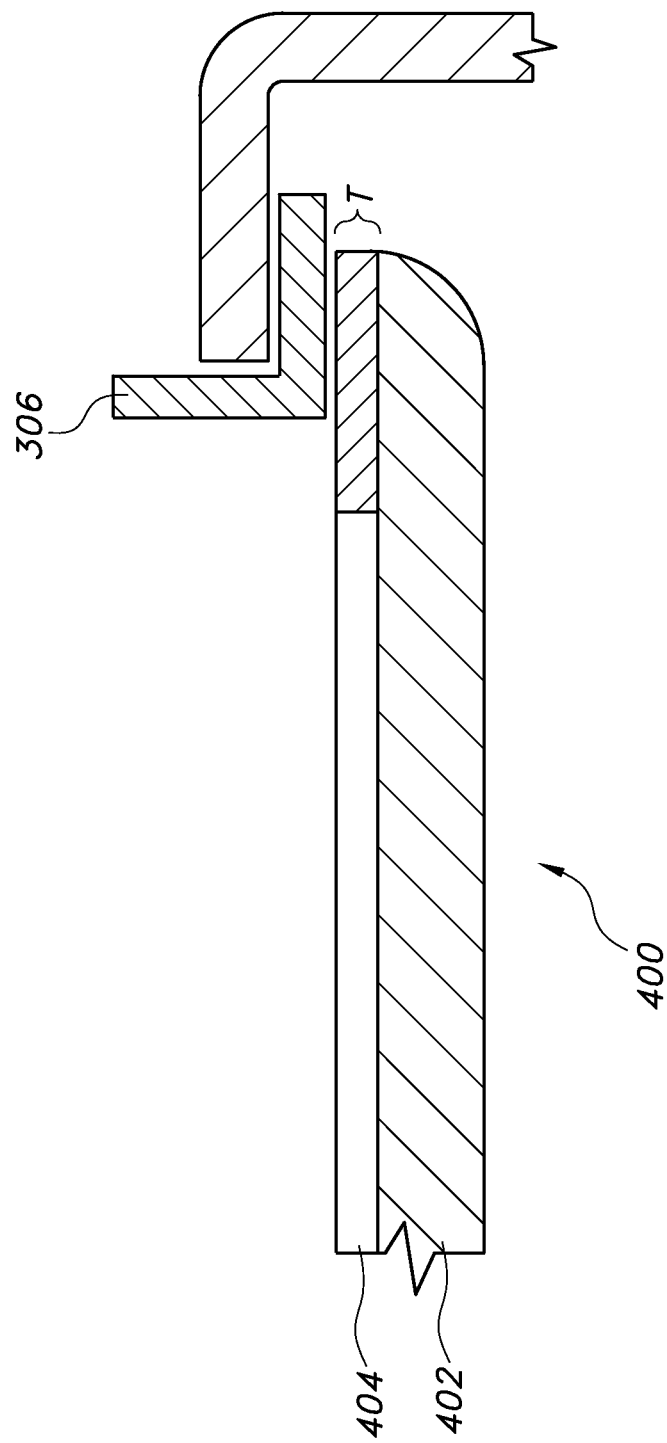
FIG. 4 depicts a B-pillar upper cloth-wrapped class A surface and a B-pillar upper molded class A surface.

FIG. 4 depicts B-pillar upper class A surfaces 400, being a molded B-pillar class A surface 402 overlaid by a cloth-wrapping 404. As shown in the figure, the cloth-wrapped class A surface 402 presents an extra thickness T due to the cloth wrapping compared to just the underlying molded class A surface 404, which thickness is accommodated by the different catches 108, 110 described above for the reversible bracket 100.

Figure 5B:
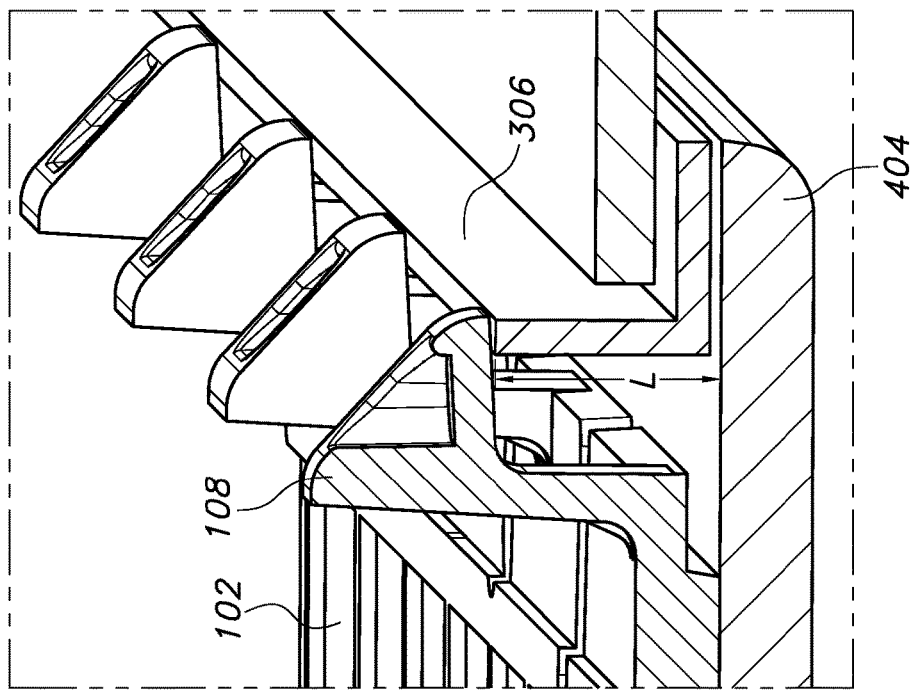
FIG. 5B depicts a trim piece including a molded class A surface attached to a vehicle B-pillar.
Figure 5A:
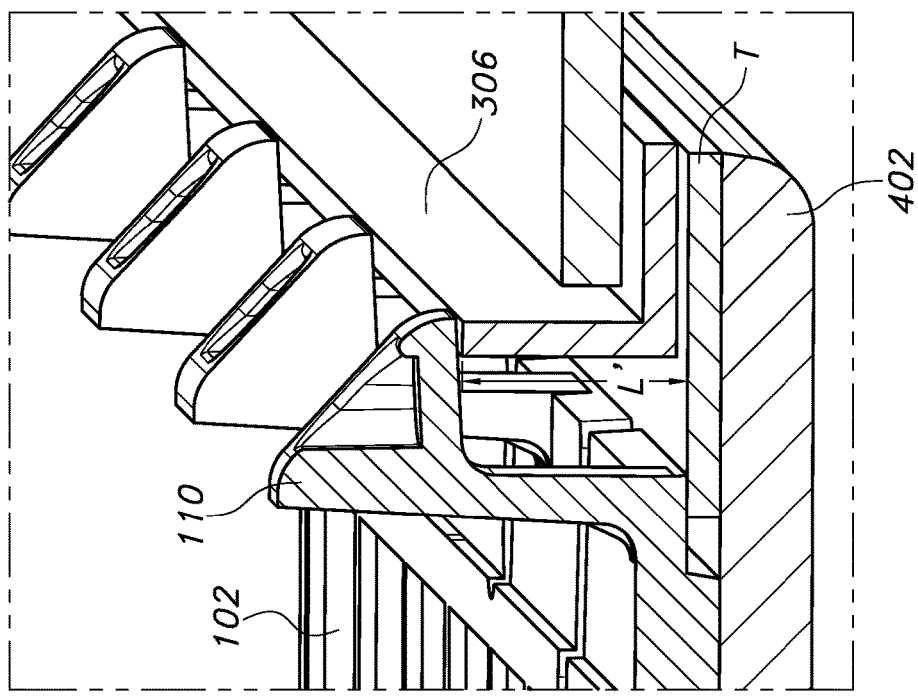
FIG. 5A depicts a trim piece including a cloth-wrapped class A surface attached to a vehicle B-pillar.

Specifically, to attach a trim piece 300 including a cloth-wrapped class A surface 402, it is only necessary to orient bracket 100 whereby catches 110 defining length dimension L' engage slider engaging surface 306 (see FIG. 5A). On the other hand, for a trim piece 300 including a molded class A surface 404, bracket 100 is oriented whereby catches 108 having a lesser length L engage slider engaging surface 306 (see FIG. 5B). Once the bracket 100 is properly oriented using the engagement of poka-yoke notches 112 and cooperating tabs 304, it may be attached to the trim piece 300 by any suitable means.

As will be appreciated, by the described reversible bracket 100, different styles/thicknesses of vehicle trim pieces may be attached, but without requiring different configurations of bracket. Thus, expenses of tooling and manufacture are reduced, while still providing flexibility in trim styles/packages provided to the customer.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle trim piece assembly, comprising:
   a trim piece body defining a class A surface; and
   a reversible bracket adapted to attach the trim piece body to a slider, the reversible bracket comprising a body including a first attachment edge and a second attachment edge that is differently configured from the first attachment edge.

2. The trim piece of claim 1, wherein the first attachment edge and second attachment edge are configured to engage a cooperating surface on the slider.

3. The trim piece of claim 2, wherein the slider is adapted to attach the trim piece body to a vehicle B-pillar.

4. The trim piece of claim 2, wherein the first attachment edge includes one or more catches defining a first length for engaging the cooperating surface.

5. The trim piece of claim 4, wherein the second attachment edge includes one or more catches defining a second length for engaging the cooperating surface, the second length being different from the first length.

6. The trim piece of claim 1, further including an orienting structure for properly orienting the bracket body.

7. The trim piece of claim 6, wherein the orienting structure is one or more notches defined in the bracket body for engaging one or more cooperating tabs associated with the vehicle trim piece.

8. A vehicle B-pillar and trim assembly, comprising:
   a B-pillar;
   a B-pillar trim piece including a body defining a class A surface; and
   a reversible bracket comprising a body including a first attachment edge and a second attachment edge that is differently configured from the first attachment edge, the first attachment edge and second attachment edge being configured to engage a cooperating surface carried by a slider adapted to attach to the B-pillar.

9. The B-pillar and trim assembly of claim 8, wherein the first attachment edge includes one or more catches defining a first length for engaging the cooperating surface and the second attachment edge includes one or more catches defining a second length for engaging the cooperating surface, the second length being different from the first length.

10. The B-pillar and trim assembly of claim 8, further including an orienting structure for properly orienting the bracket body.

11. The B-pillar and trim assembly of claim 10, wherein the orienting structure is one or more notches defined in the bracket body for engaging one or more cooperating tabs associated with the vehicle trim piece.

12. The B-pillar and trim assembly of claim 8, wherein the trim piece class A surface is one of a cloth-wrapped class A surface or a molded class A surface.

\* \* \* \* \*